United States Patent [19]

Faust et al.

[11] 4,221,851
[45] Sep. 9, 1980

[54] STABLE ELECTROLYTE FOR LITHIUM BATTERIES

[75] Inventors: Matthew J. Faust, Norristown; James R. Picozzi, Hatfield, both of Pa.

[73] Assignee: Honeywell Inc., Minneapolis, Minn.

[21] Appl. No.: 921,381

[22] Filed: Jul. 3, 1978

[51] Int. Cl.³ ............................................. H01M 6/14
[52] U.S. Cl. ................................... 429/197; 429/199; 252/62.2
[58] Field of Search .................... 429/194, 199, 197; 252/62.2, 62.3, 500, 518

[56] References Cited

U.S. PATENT DOCUMENTS

| | | | |
|---|---|---|---|
| 3,887,397 | 6/1975 | Horning | 429/194 |
| 3,960,594 | 6/1976 | Fritz et al. | 429/194 |
| 4,002,492 | 1/1977 | Rao | 429/194 |
| 4,049,892 | 9/1977 | Kronenberg | 429/194 |
| 4,107,404 | 8/1978 | Horning et al. | 429/194 |

*Primary Examiner*—Charles F. LeFevour
*Attorney, Agent, or Firm*—John S. Munday

[57] ABSTRACT

A stable electrolyte composition for use in a lithium anode electrochemical cell which includes an electrolyte comprising lithium hexafluroarsenate dissolved in methyl formate. A stabilizing amount of lithium tetrafluroborate is included. Also included is a stabilizing amount of a lithium alloy. These alloys typically have a Mohs hardness of greater than 0.7. Typical lithium alloys include metals selected from the group consisting of aluminum, calcium, magnesium, silicon, zinc, and mixtures thereof.

6 Claims, No Drawings

STABLE ELECTROLYTE FOR LITHIUM BATTERIES

BACKGROUND OF THE INVENTION

It has been known for some time that reserve batteries which employ lithium as an anode, methyl formate as the electrolyte solvent, and lithium hexafluroarsenate as the electrolyte salt, plus a cathode, are not stable and are particularly not stable at high temperatures. When a reserve cell is constructed so as to isolate the electrolyte, adverse chemical changes in the electrolyte take place which materially alter the chemical makeup of the electrolyte and cause a build-up of pressure which most often ruptures or otherwise destroys the container holding the electrolyte.

At the same time, these unstable electrolyte systems produce an extremely high energy due to the high conductivity of the lithium hexafluroarsenate in the solvent methyl formate. Many times design limitations require the high degree of energy that this chemical system can produce, particularly in airborne applications where additional weight is undesirable, and yet the undesirable instability causes frequent replacement and repair of damaged reserve cells.

One solution which has been proposed as a way of improving the stability of lithium hexafluroarsenate/methyl formate electrochemical cells is disclosed in U.S. Pat. No. 3,887,397. In this patent, a minor amount of lithium tetrafluroborate is included in the electrolyte to improve the stability. Nevertheless, long term storage at extremely high temperatures still results in an unacceptable high number of failures of reserve cells employing the highly conductive lithium hexafluroarsenate/methyl formate electrolyte.

Accordingly, it is an object of this invention to provide an improved stability system for lithium batteries which employ lithium hexafluroarsenate and methyl formate as the electrolyte system.

Other objects will appear hereinafter.

BRIEF DESCRIPTION OF THE INVENTION

It has now been discovered that the above and other objects of the present invention can be accomplished in the following manner. Specifically, an improved stable electrolyte composition for use in lithium anode electrochemical cells has been discovered. This electrolyte composition includes an electrolytic quantity of lithium hexafluroarsenate dissolved in methyl formate. Also included is a stabilizing amount of lithium tetrafluroborate admixed with the electrolyte. Finally, the improved composition includes a stabilizing amount of a lithium alloy. This alloy should have a Mohs hardness greater than 0.7. Preferably, the alloy will contain an alloying metal selected from the group consisting of aluminum, calcium, magnesium, silicon, zinc, and mixtures thereof. Most preferred are those alloys which contain at least a 60 percent by weight of lithium, so long as the Mohs hardness remains above 0.7.

The Mohs scale of hardness is used for the purpose of this invention as a guide to the selection of suitable alloys for use herein. Hardness, in general, is determined by what is known as Mohs's scale, a standard for hardness which is mainly applied to nonmetallic elements and minerals. In this hardness scale there are ten degrees or steps, each designated by a mineral, the difference in hardness of the different steps being determined by the fact that any member in the series will scratch any of the preceding members.

This scale is as follows:
1. Talc; 2. gypsum; 3. calcite; 4. fluor spar; 5. apatite; 6. orthoclase; 7. quartz; 8. topaz; 9. sapphire or corundum; 10. diamond.

These minerals, arbitrarily selected as standards, are successively harder, from talc, the softest of all minerals, to diamond, the hardest.

As has been set forth above, a minor amount of lithium tetrafluoroborate should be employed to assist in stabilizing the electrolyte of this invention. Normally, the minor amount of lithium tetrafluroborate will range from approximately 0.05 molar to as much 0.8 molar in the methyl formate. A more preferred range is from about 0.2 to about 0.6 molar.

As mentioned above, these batteries employ a lithium anode, and the cathode is any cathodic material which is inert to the electrolyte. Among these are $V_2O_5$, $Ag_2CrO_4$, $MoO_3$, $CF$, $MnO_2$, $CuS$, $CuF_2$, and the like. As stated above, this invention relates to a stabilizing of the electrolyte and does not require any particular cathode for its use. All that is necessary is that the cathode be inert to the electrolyte in the normal manner of lithium batteries.

The amount of lithium alloy which is to be employed as a stabilizing agent for the electrolyte of this invention will vary depending upon the foreseeable use of the electrolyte system. Normally, the alloy should be present in the electrolyte in an amount ranging from one miligram to fifteen miligrams per cubic centimeter of methyl formate. A preferred range of lithium alloy is from six miligrams to ten miligrams per cubic centimeter of electrolyte.

To demonstrate the practicality of the present invention, a number of experiments were run. In each case, a 2.0 molar solution of lithium hexafluroarsenate in methyl formate was employed. Tests were performed to determine the stability of this electrolyte alone and as modified as described hereinafter.

In one set of experiments, a measured constant quantity of electrolyte was placed in a laboratory test vessel. The vessel was then sealed and heated to 160° F. and the internal pressure was monitored through pressure sensing means attached to the vessel. In a system where the electrolyte of lithium hexafluroarsenate dissolved in methyl formate contains no additional additives, an internal pressure of 100 psi was reached in a period of four to five days. Identical tests were performed with a lithium hexafluroarsenate electrolyte dissolved in methyl formate and containing a 0.4 molar solution of lithium tetrafluroborate. The internal pressure reached 100 psi at approximately six days. In yet another series of tests, a lithium hexafluroarsenate solution in methyl formate was tested which contained 6 miligrams per cubic centimeter of a lithium alloy having 73 weight percent lithium and 27 weight percent calcium. The internal pressure reached 100 psi in approximately four to five days, showing no improvement over the untreated electrolyte. Finally, an electrolyte according to the present invention was prepared in which an identical quantity of lithium hexafluroarsenate dissolved in methyl formate was employed. The electrolyte further contained a 0.4 molar solution of lithium tetrafluroborate and contained 6 miligrams per cubic centimeter of the same lithium/calcium alloy. Again, the pressure was monitored and it was observed that the electrolyte made according to the present invention required 60 days to achieve an internal pressure of 100 psi, a factor of 10 times longer than that in the other experiments performed.

In another series of tests, various alloys of lithium having a Mohs hardness greater than 0.6 were incorporated into two molar lithium hexafluoroarsenate methyl formate electrolyte systems containing 0.4 molar lithium tetrafluroborate. These electrolytes containing the lithium alloys were incorporated into glass ampules and sealed. There were then stored at a temperature of 183° F. In the control electrolyte, which contained no lithium alloy stabilizer, approximately one-half of the control ampules exploded or fractured after storage for only 13 days, even though the lithium tetrafluroborate was present. The ampules which contained the lithium alloys experienced no failure after approximately 90 days of storage at 183° F. Among the alloys tested were the following: 83% by weight lithium/17% by weight aluminum; 73% by weight lithium/27% by weight calcium; 50% by weight lithium/50% by weight magnesium; 83% by weight lithium/17% by weight magnesium; 86% by weight lithium/14% by weight silicon; and 67% by weight lithium/33% by weight zinc.

Thus, it can be seen that the present invention significantly improves the storage capability or stability of electrolytes employing lithium hexafluoroarsenate and methyl formate for use in lithium batteries, particularly at high temperatures.

Having thus described the invention, what is claimed is:

1. A stable electrolyte composition for use in lithium electrochemical cells, comprising:
   An electrolyte quantity of lithium hexafluroarsenate dissolved in methyl formate;
   A stabilizing amount of lithium tetrafluroborate admixed with said electrolytes; and
   A stabilizing amount of a lithium alloy.

2. The composition of claim 1, wherein said alloy has a Mohs hardness of greater than 0.7.

3. The composition of claim 1, wherein the lithium alloy is an alloy of lithium and a metal selected from the group consisting of aluminum, calcium, magnesium, silicon, zinc, and mixtures thereof.

4. The composition of claim 1, wherein the amount of lithium tetrafluroborate ranges from 0.05 molar to 0.8 molar and the amount of lithium alloy ranges from one miligram to fifteen miligrams per cubic centimeter of electrolyte.

5. The composition of claim 1, wherein the amount of lithium tetrafluroborate ranges from 0.2 to 0.6 molar and the amount of lithium alloy ranges from six miligrams to ten miligrams per cubic centimeter of electrolyte.

6. The composition of claim 1, wherein said lithium alloy contains at least 60% by weight lithium.

* * * * *